US011320061B2

United States Patent
Nishimura et al.

(10) Patent No.: US 11,320,061 B2
(45) Date of Patent: May 3, 2022

(54) SOLENOID VALVE

(71) Applicant: Eagle Industry Co., Ltd., Tokyo (JP)

(72) Inventors: Naoki Nishimura, Tokyo (JP);
Hiroyuki Iwanaga, Tokyo (JP)

(73) Assignee: EAGLE INDUSTRY CO., LTD.

( * ) Notice: Subject to any disclaimer, the term of this patent is extended or adjusted under 35 U.S.C. 154(b) by 0 days.

(21) Appl. No.: 16/756,115

(22) PCT Filed: Nov. 14, 2018

(86) PCT No.: PCT/JP2018/042066
§ 371 (c)(1),
(2) Date: Apr. 14, 2020

(87) PCT Pub. No.: WO2019/102909
PCT Pub. Date: May 31, 2019

(65) Prior Publication Data
US 2020/0318752 A1    Oct. 8, 2020

(30) Foreign Application Priority Data
Nov. 22, 2017 (JP) .............................. JP2017-225041

(51) Int. Cl.
*F16K 31/06* (2006.01)

(52) U.S. Cl.
CPC ...... *F16K 31/0655* (2013.01); *F16K 31/0675* (2013.01)

(58) Field of Classification Search
CPC .......................... F16K 31/0675; F16K 31/0655
See application file for complete search history.

(56) References Cited

U.S. PATENT DOCUMENTS

| | | | |
|---|---|---|---|
| 4,971,116 A * | 11/1990 | Suzuki | H01F 7/1638 137/625.65 |
| 5,076,323 A * | 12/1991 | Schudt | F16K 31/0637 137/596.17 |

(Continued)

FOREIGN PATENT DOCUMENTS

| | | | | |
|---|---|---|---|---|
| JP | 7-27246 | 1/1995 | ............. | F16K 31/06 |
| JP | 2010-106899 | 5/2010 | ............. | F16K 31/06 |

(Continued)

OTHER PUBLICATIONS

International Search Report and Written Opinion issued in PCT/JP2018/042066, dated Feb. 5, 2019, with English translation, 18 pgs.

(Continued)

*Primary Examiner* — Angelisa L. Hicks
(74) *Attorney, Agent, or Firm* — Hayes Soloway P.C.

(57) ABSTRACT

A solenoid valve includes a sleeve configured such that a spool is movably arranged in the axial direction in the sleeve, a stationary iron core, a movable iron core, and a solenoid unit fixed to one end of the sleeve in the axial direction and configured to move the spool in the axial direction in accordance with movement of the movable iron core. The sleeve has a groove provided at the outer periphery thereof on a side of the solenoid unit and a through hole communicating with the groove and the inside of the sleeve.

(Continued)

An attachment portion adjacent to the groove in the axial direction is provided at one end of the sleeve in the axial direction. A recess portion having a larger axial dimension than that of the attachment portion is provided at the stationary iron core.

15 Claims, 5 Drawing Sheets

(56) References Cited

U.S. PATENT DOCUMENTS

| | | | | |
|---|---|---|---|---|
| 6,315,268 | B1 * | 11/2001 | Cornea | F16K 31/0613 |
| | | | | 137/625.65 |
| 6,367,434 | B1 * | 4/2002 | Steigerwald | H01F 7/127 |
| | | | | 123/90.15 |
| 6,619,615 | B1 * | 9/2003 | Mayr | H01F 7/13 |
| | | | | 251/129.08 |
| 7,686,038 | B2 * | 3/2010 | Chavanne | F16K 31/0631 |
| | | | | 137/625.65 |
| 8,134,436 | B2 * | 3/2012 | Yasoshima | H01F 7/128 |
| | | | | 335/220 |
| 2010/0326552 | A1 * | 12/2010 | Suzuki | F16K 31/0613 |
| | | | | 137/625.64 |
| 2016/0329143 | A1 | 11/2016 | Irie et al. | H01F 7/081 |

FOREIGN PATENT DOCUMENTS

| | | | |
|---|---|---|---|
| JP | 2010-223279 | 10/2010 | F16K 31/06 |
| JP | 2014-110372 | 6/2014 | H01F 7/16 |
| JP | 2015-195301 | 11/2015 | H01F 7/16 |
| JP | 2016-211657 | 12/2016 | F16K 11/07 |
| JP | 2017-157791 | 9/2017 | H01K 42/02 |
| WO | 2015/115298 | 8/2015 | H01K 7/06 |

OTHER PUBLICATIONS

International Preliminary Report on Patentability issued in PCT/JP2018/04206, dated May 26, 2020, English translation, 9 pages.
International Preliminary Report on Patentability issued in PCT/JP2018/042066, dated May 26, 2020, English translation, 9 pages.
Chinese Official Action issued in corresponding Chinese Application Serial No. 201880065703.9, dated Jul. 14, 2021 (12 pages).

* cited by examiner

SOLENOID VALVE

TECHNICAL FIELD

The present invention relates to a solenoid valve used for hydraulic control of a hydraulic circuit, for example.

BACKGROUND ART

A solenoid valve uses a spool movable in an axial direction by a drive portion using a solenoid, thereby controlling the pressure and flow rate of control fluid in a fluid circuit. As such a conventional solenoid valve, there is proposed a solenoid valve including a spool accommodated in a sleeve and an electromagnetic portion (a solenoid unit) arranged on one end side of the spool and operated in an axial direction by a solenoid and arranged between a pressure source such as a pump or an accumulator and a load to supply, to the road side, control fluid whose pressure and flow rate have been adjusted in accordance with movement of the spool (see, e.g., Patent Citation 1).

In the solenoid valve of Patent Citation 1, in a state in which an end face of a flange portion formed at an end portion of the sleeve and an end face of a flange portion formed at an end portion of a core forming the electromagnetic portion contact each other, swaging is performed together with one end of a solenoid case in the axial direction, the solenoid case surrounding a coil. In this manner, the sleeve and the electromagnetic portion are integrally fixed. Moreover, there is one configured such that an annular groove portion is provided at an end portion of a flangeless cylindrical sleeve and the sleeve and an electromagnetic portion are integrally fixed in such a manner that an outer diameter side of a flange portion is swaged in a state in which the sleeve is inserted into a recess portion provided at an end face of a core forming the electromagnetic portion. Thus, the sleeve has a simple structure, and is formed small in a radial direction.

Moreover, in such a solenoid valve, a drain port (formed as a through hole) penetrating the sleeve in the radial direction is provided, and fluid leaking in the axial direction from between a valve of a spool and a valve seat of the sleeve is released. Further, there is proposed a solenoid valve which is configured such that the annular groove portion is provided at a position at which the drain port is provided at the outer periphery of the sleeve. With this configuration, fluid discharged from the drain port can be smoothly discharged without accumulation at the outer periphery of the sleeve.

CITATION LIST

Patent Literature

Patent Citation 1: JP 2016-211657 A (page 5 and first drawing)

SUMMARY OF INVENTION

Technical Problem

However, in such a solenoid valve, the sleeve is formed small in the radial direction. For this reason, in a case where swaging is performed using the groove provided at the electromagnetic-portion-side end portion of the cylindrical sleeve and the drain port is further provided, both of two grooves i.e., one groove for swaging and another groove for the drain port need to be provided at the sleeve. Thus, there are problems that the sleeve is formed long in the axial direction and the step of processing the sleeve is complicated.

The present invention has been made in view of these problems, and is intended to provide a solenoid valve configured so that the step of processing a sleeve can be simplified and a sleeve can be formed small in a radial direction and short in an axial direction.

Solution to Problem

For solving the above-described problems, a solenoid valve according to the present invention includes:

a sleeve configured such that a spool is movably arranged in an axial direction in the sleeve;

a stationary iron core;

a movable iron core; and a solenoid unit fixed to one end of the sleeve in the axial direction and configured to move the spool in the axial direction in accordance with movement of the movable iron core.

One end of the sleeve in the axial direction is fixed to the stationary iron core through swaging process.

The sleeve has a groove provided at the outer periphery thereof on a side of the solenoid unit and a through hole communicating with the groove and the inside of the sleeve An attachment portion adjacent to the groove in the axial direction is provided at one end of the sleeve in the axial direction.

A recess portion having a larger axial dimension than that of the attachment portion is provided at the stationary iron core.

According to the aforesaid characteristics of the solenoid valve, the groove provided at the outer periphery of the sleeve on a side of the solenoid unit can partially form the attachment portion inserted into and swaged to the recess portion of the stationary iron core and cam be a space for outflow/inflow of fluid through the through hole without accumulation. That is, the attachment portion and the space can be formed using the common groove. Thus, the step of processing the sleeve can be simplified. Moreover, the through hole is provided at the groove partially forming the attachment portion at one end of the sleeve in the axial direction. Thus, the through hole can be arranged at a position close to the solenoid unit in the axial direction, and the sleeve can be formed small in a radial direction and short in the axial direction.

Preferably, the groove may have a larger axial dimension than that of the through hole.

According to this preferable constitution, the through hole can be, at the groove, arranged separately in the axial direction from the solenoid unit side on which the attachment portion is formed. In a state in which the attachment portion is fixed to the stationary iron core trough the swaging process, the through hole is less closed. Thus, a flow path for outflow/inflow fluid through the through hole is easily ensured.

Preferably, the groove may has, at least at one end thereof on a side of the attachment portion, a tapered shape in a cross section parallel to the axial direction.

According to this preferable constitution, a groove-side outer peripheral edge of the attachment portion is in the tapered shape, and therefore, the stationary iron core can be easily deformed along the tapered shape of the attachment portion. Thus, the swaging of the stationary iron core can be easily performed.

Preferably, the solenoid unit may include:

a molded solenoid body arranged at the outer periphery of the movable iron core;

a solenoid case configured to accommodate the movable iron core and the molded solenoid body; and the stationary iron core arranged inside the molded solenoid body.

The stationary iron core has a thin portion formed with a small plate thickness in a circumferential direction and has a flange portion formed on one end thereof on a side of the attachment portion and extending toward an outer diameter side.

The solenoid case has a load receiving portion configured to receive a load in the axial direction when the flange portion of the stationary iron core is fixed to the attachment portion through swaging process.

The load receiving portion is arranged on an opposite side to the flange portion in the axial direction as well as on the outer diameter side with respect to the thin portion.

According to this preferable constitution, when the flange portion of the stationary iron core is swaged to the attachment portion of the sleeve, a load acting in the axial direction is received by the load receiving portion provided in the solenoid case on the opposite side of the flange portion in the axial direction and on the outer diameter side of the thin portion, and therefore, load application to the thin portion of the stationary iron core in the axial direction is reduced in the solenoid case. Thus, the plate thickness of the thin portion of the stationary iron core can be reduced.

Preferably, the sleeve is provided with a large-diameter portion adjoining one end of the groove on an opposite side of the attachment portion, and an outer diameter of the large-diameter portion may be a maximum outer diameter of the sleeve.

According to this preferable constitution, fluid flowing out of the inside of the sleeve through the through hole formed to communicate with the groove is held back in the axial direction by the large-diameter portion formed on the opposite side to the attachment portion in the axial direction. Thus, influence on outflow/inflow fluid through other through holes formed in the sleeve on an opposite side of the attachment portion over the large-diameter portion in the axial direction can be reduced.

Preferably, the sleeve further may have, in addition to the through hole, another through hole, the two through holes being arranged to be opposite to each other through the large-diameter portion and to be out of phase in circumferential position.

According to this preferable constitution, the two through holes are positioned oppositely to each other through the large-diameter portion and with different phases in circumferential position, and therefore, fluid outflowing/inflowing through one of the two through holes can be restrained from influencing fluid outflowing/inflowing through the other one of the two through holes.

DESCRIPTION OF EMBODIMENTS

A mode for carrying out a solenoid valve according to the present invention will be described below with reference to an embodiment.

Embodiment

Figure 3:
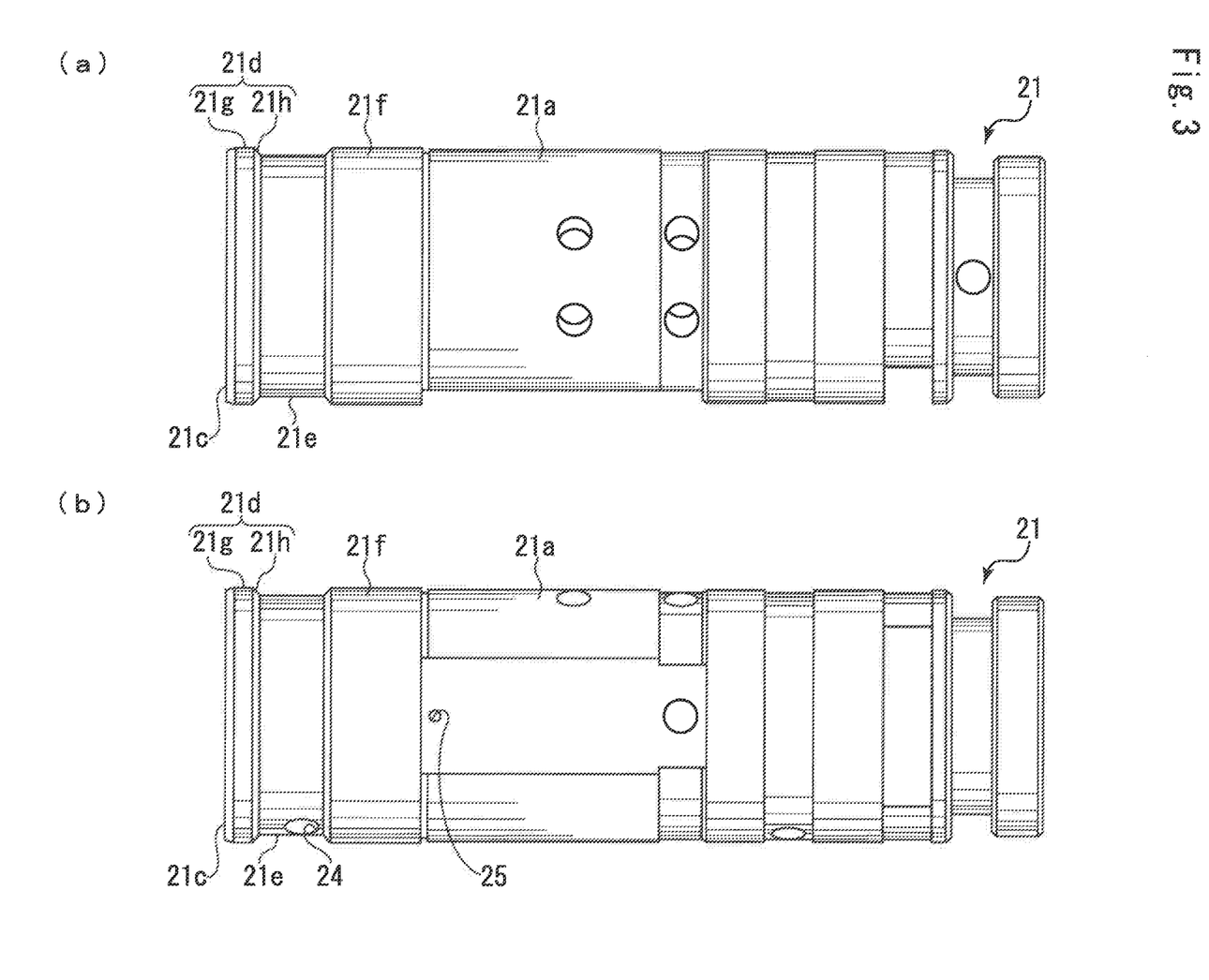
FIG. 3A is an upper view of a structure of a sleeve in the embodiment.
FIG. 3B is a side view thereof.
Figure 4:
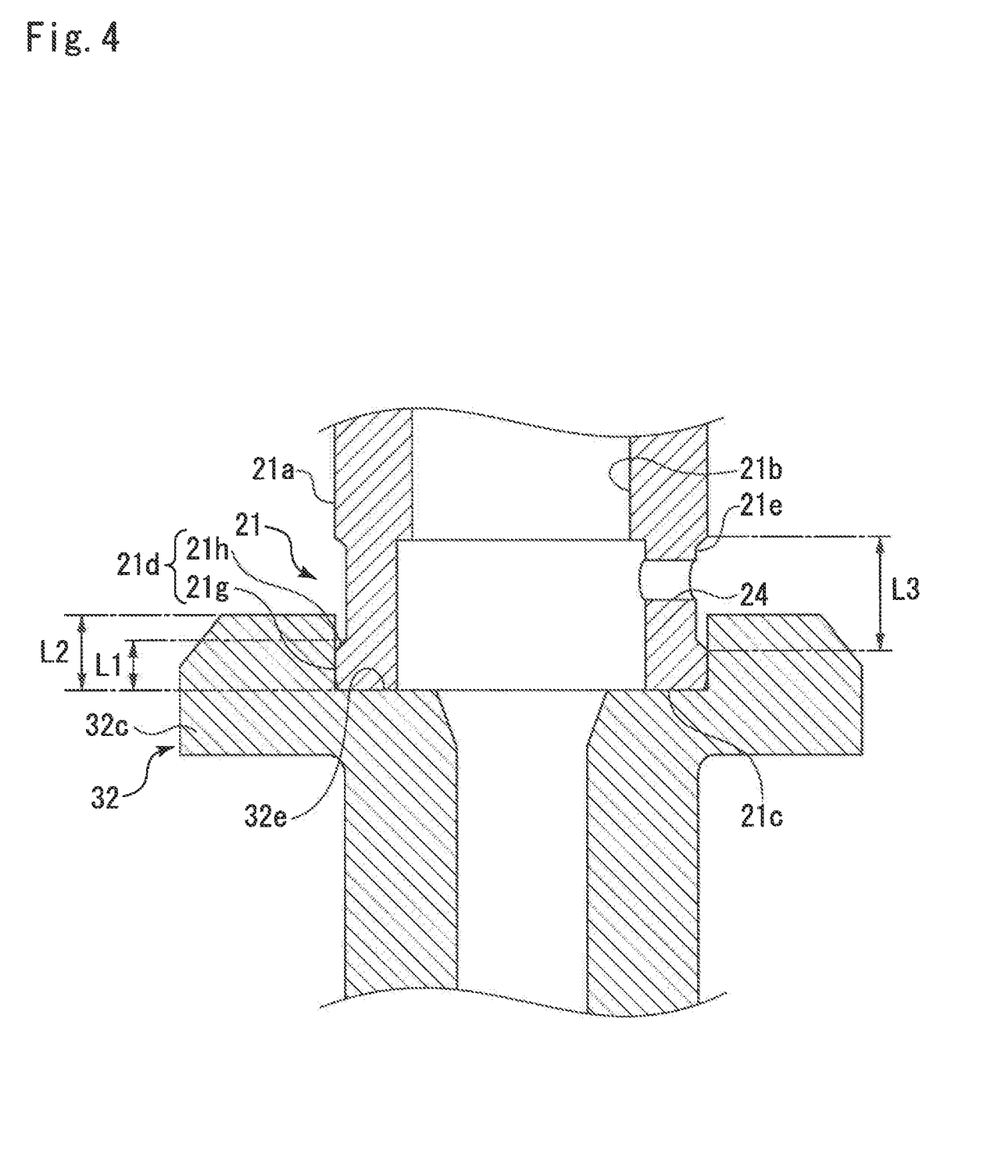
FIG. 4 is a partially-enlarged sectional view of a structure of a left end portion of the sleeve in an axial direction and a structure of a recess portion of a center post in the embodiment.
Figure 5:
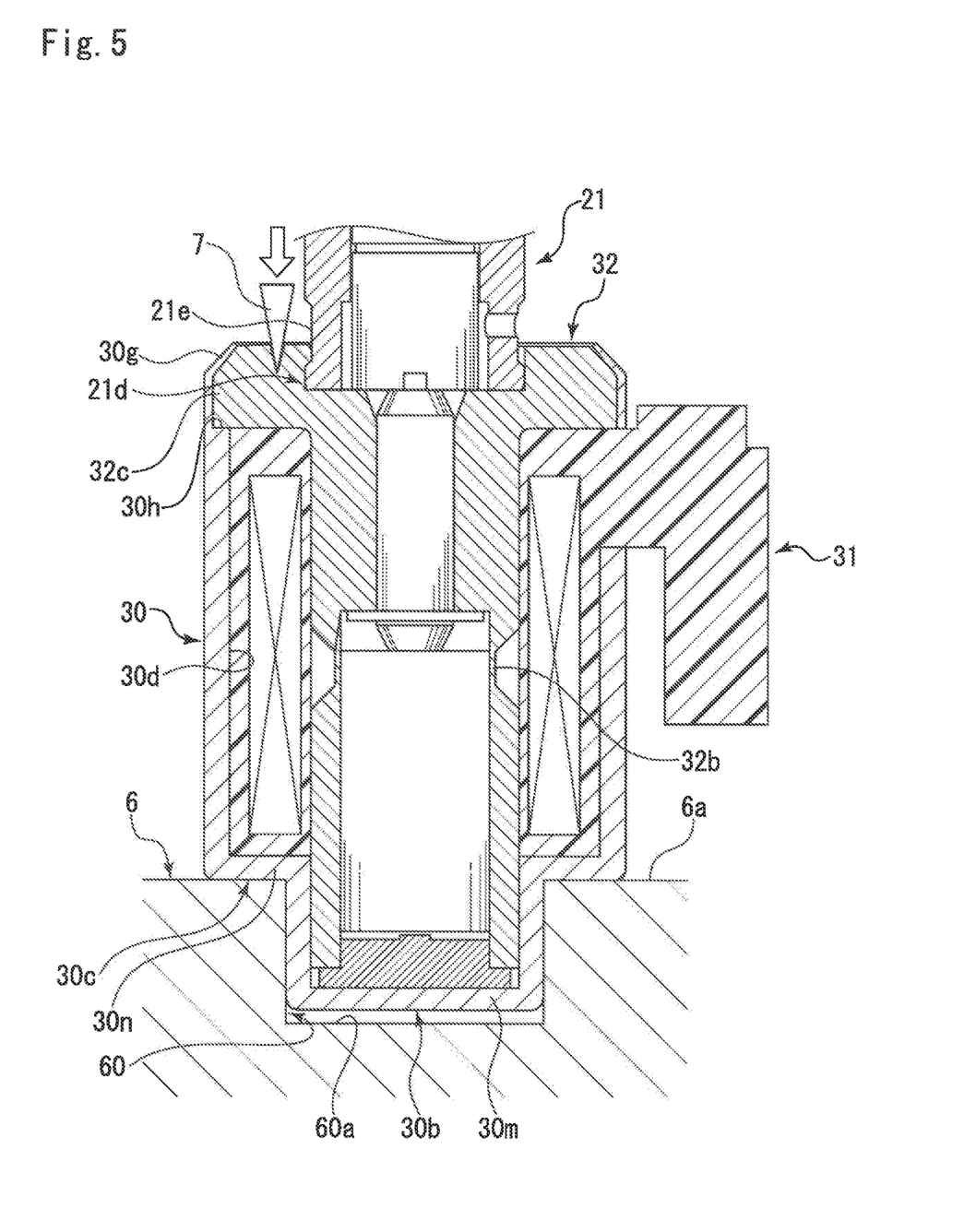
FIG. 5 is a partial sectional view illustrating the method for swaging the center post and the sleeve with a swaging jig.

A solenoid valve according to an embodiment of the present invention will be described with reference to FIGS. 1 to 5. Hereinafter, a left side on the plane of paper of FIG. 2 will be described as an upper side of the solenoid valve, and a right side on the plane of paper of FIG. 2 will be described as a lower side of the solenoid valve. Note that a plunger 4, a rod 5, and a spool 22 illustrated in FIGS. 2 and 5 are not illustrated as sectional views, but are illustrated as side views.

A solenoid valve 1 is a spool type solenoid valve, and for example, is used for a device controlled by a hydraulic pressure of an automatic transmission of a vehicle. Note that the solenoid valve 1 is, in a horizontal direction, attached to a not-shown attachment target member such as a valve housing.

Figure 1:
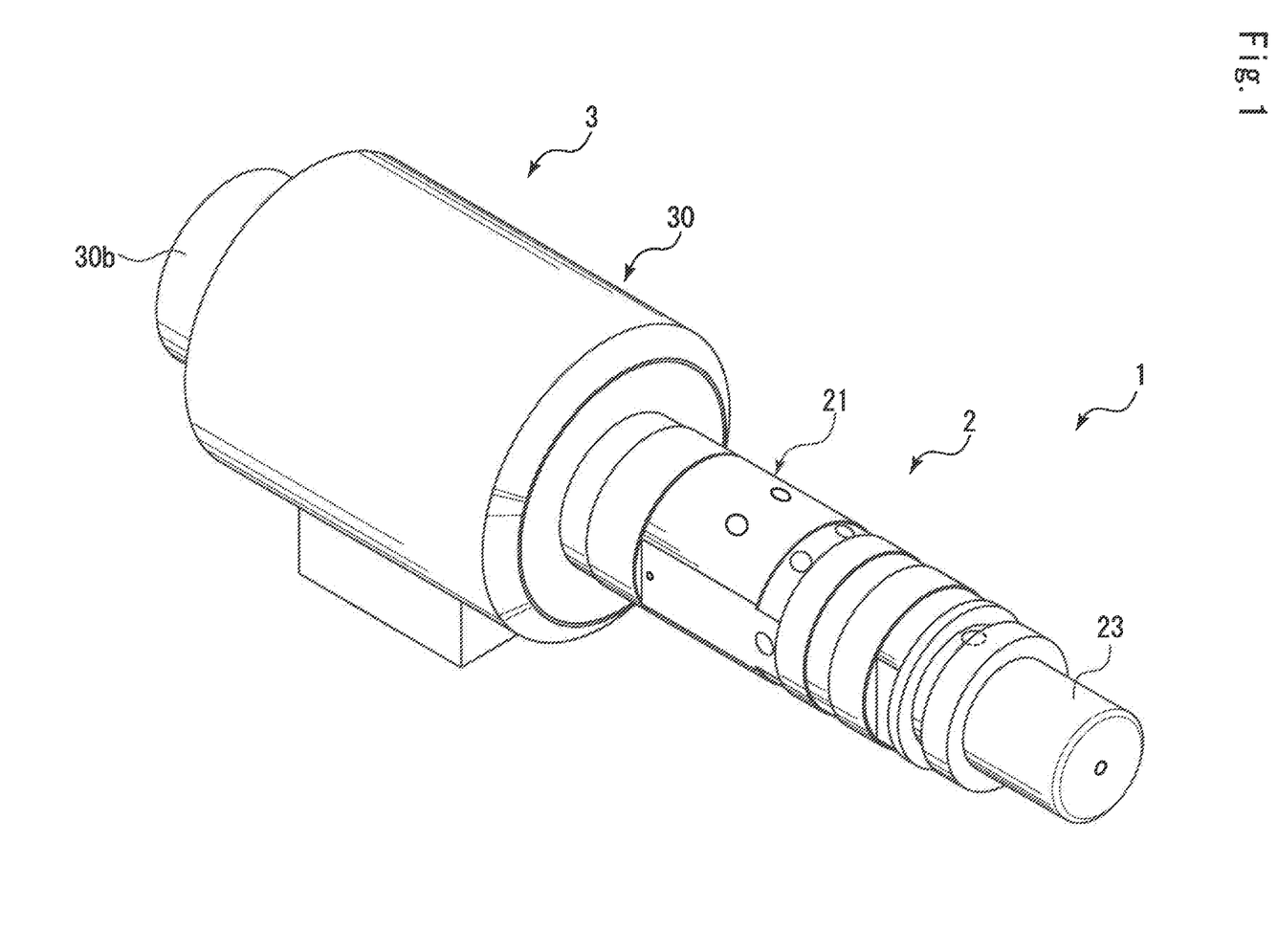
FIG. 1 is a perspective view of a solenoid valve according to an embodiment of the present invention.
Figure 2:
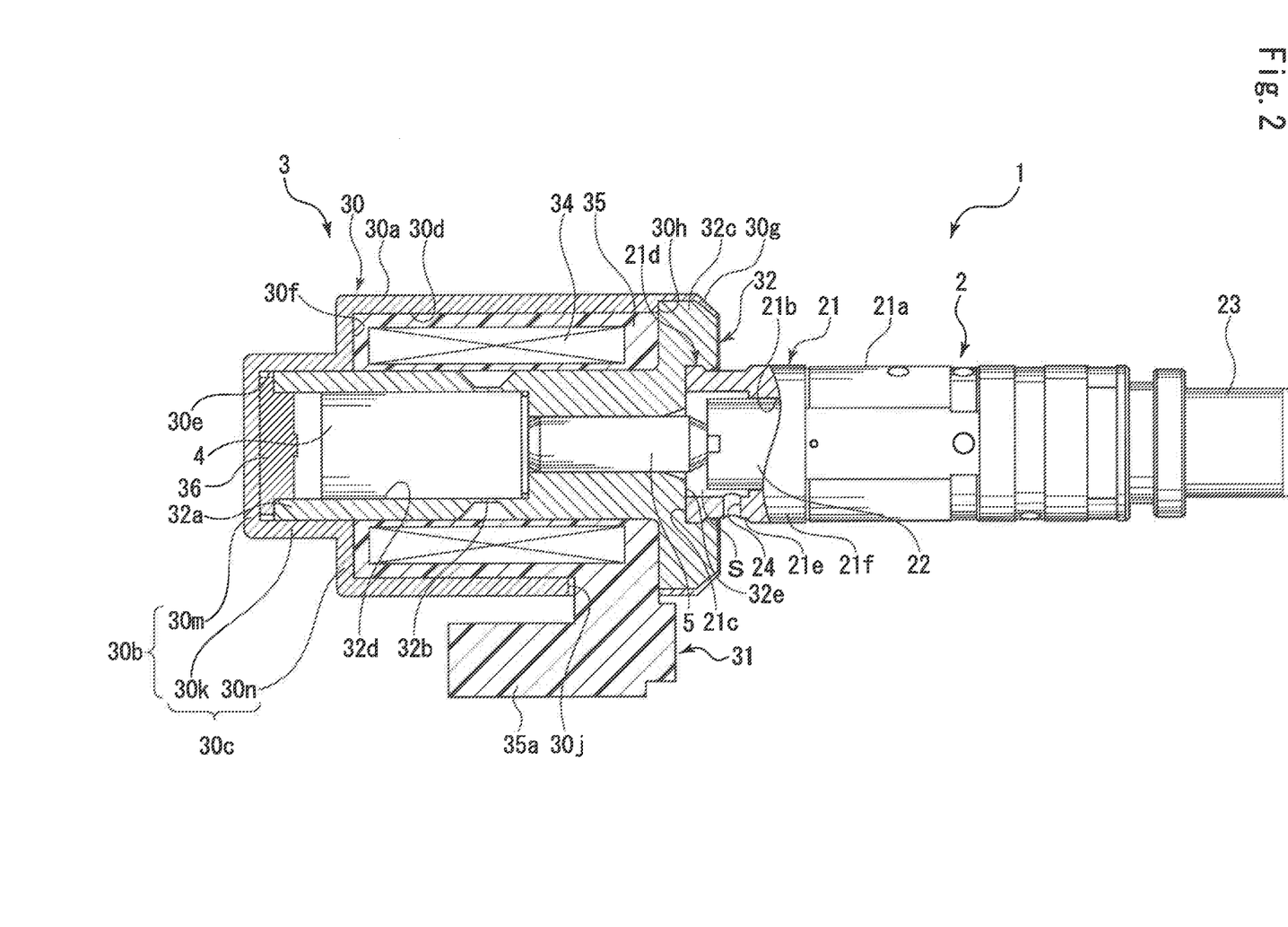
FIG. 2 is a partially-cutout sectional view of the solenoid valve structure in the embodiment.

As illustrated in FIGS. 1 and 2, the solenoid valve 1 is configured such that a valve unit 2 as a valve configured to adjust a fluid flow rate is integrally attached to a solenoid unit 3 as an electromagnetic drive portion. Note that FIG. 2 illustrates an ON state of the solenoid valve 1 upon power distribution to a coil 34 of a molded solenoid body 31.

The valve unit 2 includes a sleeve 21 configured such that opening portions of various ports such as an input port, an output port, a discharge port, a drain port 24, and a feedback port 25 connected to a flow path provided in the not-shown valve housing are provided at the outer periphery of the valve unit 2, a spool 22 liquid-tightly accommodated in a through hole 21b of the sleeve 21 and having not-shown multiple lands, a not-shown coil-shaped spring configured to bias the spool 22 to the left in an axial direction, and a retainer 23 configured to hold the spring. Such a configuration is a well-known configuration of a spool valve, and therefore, detailed description thereof will be omitted. Note that the sleeve 21, the spool 22, and the retainer 23 are made of a material such as aluminum, iron, stainless steel, or resin. A structure of the sleeve 21 partially forming the valve unit 2 will be described in detail later.

As illustrated in FIG. 2, a solenoid unit 3 mainly includes a solenoid case 30 made of a metal material having magnetic properties, such as iron, a molded solenoid body 31 accommodated in the solenoid case 30, and a center post 32 (i.e., a stationary iron core) arranged inside the molded solenoid body 31.

The solenoid case 30 mainly includes a cylindrical portion 30a covering the outer periphery of the molded solenoid body 31 and a bottomed cylindrical protrusion portion 30b protruding to the left in the axial direction on the left side of the cylindrical portion 30a in the axial direction and formed with a smaller diameter than that of the cylindrical portion 30a, and is arranged such that the center axis of the cylindrical portion 30a and the center axis of the protrusion portion 30*b* are substantially coincident with each other. The protrusion portion 30*b* includes a discoid bottom plate 30*m* and a cylindrical side plate 30*k* continuing perpendicularly to the bottom plate 30*m* and extending in the axial direction. Moreover, the side plate 30*k* and an annular end plate 30*n* extending perpendicularly to the side plate 30*k* in an outer diameter direction and continuing perpendicularly to the cylindrical portion 30*a* form an annular step portion 30*c* (a load receiving portion) at a left end of the cylindrical portion 30*a* in the axial direction. Note that upon swaging as described later, the end plate 30*n* of the annular step portion 30*c* functions as the load receiving portion configured to receive a load in the axial direction.

Moreover, the inside of the solenoid case 30 includes a first cylindrical accommodation portion 30*d* defined by an inner face of the cylindrical portion 30*a* and configured to accommodate the molded solenoid body 31 and a second cylindrical accommodation portion 30*e* defined by an inner face of the protrusion portion 30*b* on the left side of the first cylindrical accommodation portion 30*d* in the axial direction and configured such that a left end portion of a cylindrical portion 32*a* of the center post 32 in the axial direction is inserted into the second cylindrical accommodation portion 30*e*. The above-described end plate 30*n* is formed in a radial direction on the left side of the first cylindrical accommodation portion 30*d* in the axial direction. That is, the end plate 30*n* of the annular step portion 30*c* of the solenoid case 30 is formed on an outer diameter side and the left side in the axial direction with respect to the cylindrical portion 32*a* (including a thin portion 32*b* described later) of the center post 32.

Moreover, the solenoid case 30 is configured such that a predetermined portion thereof extending from a right opening portion end of the cylindrical portion 30*a* in the axial direction to the left in the axial direction is formed thinly, thereby forming a claw portion 30*g* in the vicinity of the opening portion end. Note that at a right end portion of the cylindrical portion 30*a* in the axial direction, an annular planar portion 30*h* extending to an inner diameter side in the radial direction is formed on the left side of the claw portion 30*g* in the axial direction. On the inner diameter side, the annular planar portion 30*h* continues perpendicularly to an inner face of the first cylindrical accommodation portion 30*d*.

The molded solenoid body 31 is formed by molding of the coil 34 with resin 35, and control current is supplied to the coil 34 from a connector of a connector portion 35*a* extending to the outside from an opening portion 30*j* provided on the lower side of the solenoid case 30 in the radial direction.

As illustrated in FIG. 2, the center post 32 is formed in a flanged cylindrical shape including the cylindrical portion 32*a* and a flange portion 32*c* extending in the radial direction at a right end portion of the cylindrical portion 32*a* in the axial direction, and is configured such that a through hole 32*d* capable of accommodating the plunger 4 (i.e., a movable iron core) and the rod 5 is formed at the center of the cylindrical portion 32*a* in the radial direction. A holder 36 made of, e.g., resin is attached to a left opening end of the cylindrical portion 32*a* in the axial direction. Note that a left end face of the holder 36, which is attached to the left opening end of the cylindrical portion 32*a* in the axial direction, is provided slightly apart from the bottom plate 30*m* of the protrusion portion 30*b* of the solenoid case 30, and a gap is formed in the axial direction.

Moreover, the thin portion 32*b* formed with a small plate thickness, which is smaller than plate thicknesses of any other portions of the center post 32, is provided at the cylindrical portion 32*a* of the center post 32 in such a manner that the substantially center part of an outer peripheral surface of the cylindrical portion 32*a* in the axial direction is circumferentially recessed in an isosceles trapezoidal shape toward the inner diameter side as viewed in the section. Note that the thickness of the thin portion 32*b* of the center post 32 is equal to or less than 0.4 mm.

At a right end face of the flange portion 32*c* of the center post 32 in the axial direction, a recess portion 32*e* recessed to the left in the axial direction is provided at the center of the right end face in the radial direction. A later-described attachment portion 21*d* at a left end portion of the sleeve 21 in the axial direction is fixed to the flange portion 32*c* of the center post 32 through swaging process in a state in which the attachment portion 21*d* is inserted into the flange portion 32*c* of the center post 32. Note that an outer peripheral edge of a right end face of the flange portion 32*c* in the axial direction is chamfered. Moreover, at the center post 32, the recess portion 32*e* of the flange portion 32*c* is formed with the substantially same diameter as that of the attachment portion 21*d* of the sleeve 21 and with a larger diameter than that of the thin portion 32*b* of the cylindrical portion 32*a* of the center post 32.

Moreover, in a state in which an outer peripheral edge portion of a left end face of the flange portion 32*c* of the center post 32 in the axial direction contacts the annular planar portion 30*h* formed on the inner diameter side with respect to the right end portion of the cylindrical portion 30*a* of the solenoid case 30 in the axial direction, the claw portion 30*g* is swaged along the above-described chamfered portion formed at the outer peripheral edge of the right end face of the flange portion 32*c* in the axial direction, and in this manner, the center post 32 is fixed to the solenoid case 30 in the axial direction. In this state, a left end of the molded solenoid body 31 in the axial direction is provided slightly apart from an annular planar portion 30*f* corresponding to a right end face of the annular step portion 30*c* in the axial direction, the annular step portion 30*c* forming a step portion at a left end portion of the end plate 30*n* of the solenoid case 30 in the axial direction. Thus, a gap is formed between the left end of the molded solenoid body 31 and the annular planar portion 30*f* in the axial direction.

Next, the structure of the sleeve 21 forming the valve unit 2 will be described. As illustrated in FIGS. 2 to 4, the sleeve 21 is formed in a cylindrical shape opening at both ends in the axial direction. The sleeve 21 mainly includes a cylindrical portion 21*a* formed with the openings of various ports, the through hole 21*b* configured so that the spool 22 can be accommodated inside the cylindrical portion 21*a*, the attachment portion 21*d* having an opening end face 21*c* on the left side of the cylindrical portion 21*a* in the axial direction, an annular groove 21*e* recessed toward the inner diameter side, the drain port 24 (formed as a through hole) penetrating the sleeve 21 in the radial direction on the right side of the attachment portion 21*d* and directly communicating with the groove 21*e* and inside of the sleeve 21, and a large-diameter portion 21*f* formed with the substantially same diameter as that of the attachment portion 21*d* on the right side of the groove 21*e* in the axial direction. Note that the large-diameter portion 21*f* defines the maximum outer diameter at the sleeve 21. Moreover, the drain port 24 is preferably used at a lower position when the solenoid valve 1 is incorporated into the not-shown valve housing upon use. Further, the drain port 24 is formed with the phase of the drain port 24 being shifted in the circumferential direction with respect to the feedback port 25 (formed as another through hole) positioned adjacent to the drain port 24 with at least the large-diameter portion 21f being interposed therebetween. The drain port 24 and the feedback port 25 are out of phase in circumferential position.

Moreover, in the present embodiment, a space S (see FIG. 2) formed at a left end portion of the through hole 21b of the sleeve 21 in the axial direction and the groove 21e provided at the outer periphery of the sleeve 21 communicate with each other through the drain port 24. In the space S in the sleeve 21, respiration is performed by outflow/inflow of fluid present around the spool 22 and the rod 5 through the drain port 24. In this manner, movement of the spool 22 and the rod 5 in the axial direction is smoothly performed. As described above, the drain port 24 of the present embodiment also serves as a respiration hole.

Regarding the steps of processing the attachment portion 21d, the groove 21e, the large-diameter portion 21f, and the drain port 24 at a left end portion of the cylindrical portion 21a of the sleeve 21 in the axial direction, the drain port 24 is, by punching with a drill, first formed at a predetermined position at the left end portion of the cylindrical portion 21a of the sleeve 21 in the axial direction. Next, at an axial position including the drain port 24, the groove 21e having a predetermined depth on the inner diameter side is formed by grooving. In this manner, formation of the attachment portion 21d including a tapered face 21h on the left side of the groove 21e in the axial direction and a peripheral face 21g extending to the left side in the axial direction with respect to the groove 21e and removal of burrs caused upon punching of the drain port 24 can be simultaneously performed. Moreover, the groove 21e is provided at the sleeve 21, and therefore, the attachment portion 21d is formed. Thus, the sleeve 21 can be formed small in the radial direction.

Note that the axial dimension of the groove 21e at the cylindrical portion 21a of the sleeve 21 is set larger than the diameter of the drain port 24. Moreover, an axial formation position of the groove 21e at the cylindrical portion 21a of the sleeve 21 is set such that the drain port 24 is arranged on the right side in the axial direction at the groove 21e, and the axial dimension L1 of the attachment portion 21d formed on the left side of the groove 21e in the axial direction is adjusted smaller than the axial dimension L2 of the recess portion 32e of the flange portion 32c of the above-described center post 32 (i.e., L1<L2) (see FIG. 4). Thus, the left opening end face 21c of the sleeve 21 in the axial direction contacts a bottom face of the recess portion 32e of the flange portion 32c of the center post 32, and therefore, the attachment portion 21d of the sleeve 21 can be completely inserted into the recess portion 32e of the flange portion 32c of the center post 32 in the axial direction. Note that for the sake of description, FIG. 4 illustrates a state in which the attachment portion 21d of the sleeve 21 is inserted into the recess portion 32e of the flange portion 32c of the center post 32 before swaging process.

Moreover, the axial dimension L3 of the groove 21e is in such a dimension relationship that the dimension L3 is less than four times as large as the axial dimension L1 of the attachment portion 21d (i.e., L3<4×L1) and is preferably less than twice (i.e., L3<2×L1) and the dimension L3 is equal to or larger than 1.5 times as large as the diameter of the drain port 24 and is preferably equal to or larger than twice. Thus, the drain port 24 can be arranged on the left end side of the sleeve 21 in the axial direction, and the length of the sleeve 21 in the axial direction can be shortened.

Moreover, the groove 21e of the sleeve 21 is formed in the so-called isosceles trapezoidal shape as viewed in the cross section parallel with the axial direction in such a manner that a right outer peripheral edge (i.e., the tapered face 21h) of the attachment portion 21d in the axial direction and a left outer peripheral edge of the large-diameter portion 21f in the axial direction are each tapered, the attachment portion 21d and the large-diameter portion 21f being formed on both sides of the groove 21e in the axial direction. Thus, burrs caused at both ends of the groove 21e in the axial direction are removed upon the formation of the groove 21e. Note that the burrs may be removed in such a manner that the right outer peripheral edge of the attachment portion 21d in the axial direction and the left outer peripheral edge of the large-diameter portion 21f in the axial direction are each processed in a step shape. Note that the sectional shape of the groove 21e may be a U-shape with a tapered curved face or a V-shape without a bottom portion.

Next, the method for swaging the center post 32 and the sleeve 21 will be described with reference to FIG. 5. Note that FIG. 5 illustrates a state in which the solenoid valve is arranged in a vertical orientation. In FIG. 5, an upper side on the plane of paper will be described as the upper side of the solenoid valve, and a lower side on the plane of paper will be described as the lower side of the solenoid valve.

As illustrated in FIG. 5, swaging of the center post 32 and the sleeve 21 is performed in such a manner that the attachment portion 21d of the sleeve 21 is inserted into the recess portion 32e provided at the flange portion 32c of the center post 32 in a state in which the protrusion portion 30b of the solenoid case 30 is inserted from above into a recess portion 60 provided at a swaging table 6 (i.e., a swaging jig) and a swaging tool 7 is driven in the axial direction into the outer diameter side of the recess portion 32e at the flange portion 32c of the center post 32. In this manner, part of the flange portion 32c of the center post 32 is swaged to deform in an inner diameter direction, and as a result the attachment portion 21d of the sleeve 21 is fixed to the center post 32. Moreover, the above-described swaging process is performed at multiple spots across the circumferential direction of the flange portion 32c of the center post 32. Note that the swaging method is not limited to above, and swaging may be performed across the circumferential direction at once in such a manner that a not-shown cylindrical swaging tool is driven in the axial direction into the outer diameter side of the recess portion 32e at the flange portion 32c of the center post 32.

The recess portion 60 of the swaging table 6 is formed with the substantially same diameter as that of the protrusion portion 30b of the solenoid case 30, and the depth of the recess portion 60 of the swaging table 6 in the axial direction is formed larger than a protruding amount of the protrusion portion 30b of the solenoid case 30. Thus, when the protrusion portion 30b of the solenoid case 30 is inserted from above into the recess portion 60 of the swaging table 6, a lower end face of the annular end plate 30n of the solenoid case 30 in the axial direction is brought into contact with an upper face 6a of the swaging table 6 in a state in which a bottom face 60a of the recess portion 60 of the swaging table 6 and the lower bottom plate 30m of the protrusion portion 30b of the solenoid case 30 in the axial direction are apart from each other in the axial direction. Moreover, the protrusion portion 30b of the solenoid case 30 is inserted from above into the recess portion 60 of the swaging table 6, and as a result, movement of the solenoid case 30 in the radial direction is restricted. Thus, misalignment between the center post 32 and the solenoid case 30 in the radial direction upon swaging can be prevented. Note that regarding the process order, either of the process of swaging the center post 32 and the solenoid case 30 or the process of swaging the center post 32 to the sleeve 21 may be performed first in the process of assembling the solenoid valve 1.

As described above, the sleeve 21 includes the groove 21e provided at the outer periphery of the left end portion in the axial direction and the drain port 24 communicating with the space S of the sleeve 21 at the groove 21e. The attachment portion 21d adjacent to the groove 21e is provided at the left end of the sleeve 21 in the axial direction. The recess portion 32e having the larger axial dimension L2 than the axial dimension L1 of the attachment portion 21d (i.e., L1<L2) is provided at the flange portion 32c of the center post 32. Thus, the groove 21e of the sleeve 21 can form the attachment portion 21d inserted into the recess portion 32e and fixed to the flange portion 32c of the center post 32 through swaging process and a space (i.e., a space between the sleeve 21 and the not-shown attachment target member) for outflow/inflow of fluid through the drain port 24 without fluid accumulation. That is, the attachment portion 21d and the space can be formed using the common groove 21e. Thus, the step of processing the sleeve 21 can be simplified. Moreover, the drain port 24 is provided at the groove 21e partially forming the attachment portion 21d at the left end portion of the sleeve 21 in the axial direction. Thus, the drain port 24 can be arranged at a position close to the solenoid unit 3 in the axial direction, and the sleeve 21 can be formed small in the radial direction and short in the axial direction.

Moreover, the groove 21e of the sleeve 21 has the larger axial dimension than that of the drain port 24. Thus, the drain port 24 can be arranged at the groove 21e on the opposite side (i.e., the right side) with respect to the attachment portion 21d arranged on the left side of the groove 21e in the axial direction. After the attachment portion 21d of the sleeve 21 is fixed to the flange portion 32c of the center post 32 through swaging process, the drain port 24 is not closed by the swaged portion. Thus, the flow path for outflow/inflow fluid through the drain port 24 is easily ensured.

Further, the groove 21e of the sleeve 21 is configured such that at least the right outer peripheral edge of the attachment portion 21d in the axial direction is in a tapered shape, and therefore, the flange portion 32c of the center post 32 can be easily deformed toward the inner diameter side along the tapered shape of the attachment portion 21d through swaging process. Thus, the swaging process can be easily performed.

In addition, the large-diameter portion 21f formed on the right side of the groove 21e of the sleeve 21 in the axial direction has the maximum outer diameter at the sleeve 21, and therefore, fluid flowing out of the space S in the sleeve 21 through the drain port 24 formed at the groove 21e is held back in the axial direction by the large-diameter portion 21f of the sleeve 21 formed on the right side of the groove 21e in the axial direction. Thus, influence on outflow/inflow fluid through other ports formed on the right side in the axial direction with respect to the large-diameter portion 21f can be reduced.

Moreover, the drain port 24 is formed with the phase of the drain port 24 being shifted in the circumferential direction with respect to the feedback port 25 positioned adjacent to the drain port 24 through the large-diameter portion 21f of the sleeve 21. Thus, influence on outflow/inflow fluid through the feedback port 25 adjacent to the drain port 24 through the large-diameter portion 21f can be reduced.

Further, when, on one end side of the solenoid case 30 the attachment portion 21d of the sleeve 21 is fixed to the flange portion 32c of the center post 32 by swaging process, the load acting in the axial direction is received by the end plate 30n of the annular step portion 30c provided on the other end side of the solenoid case 30 in the axial direction and on the outer diameter side with respect to the cylindrical portion 32a (including the thin portion 32b) of the center post 32. Thus, in the solenoid case 30, the load in the axial direction is less applied to the thin portion 32b of the center post 32. Consequently, the plate thickness of the thin portion 32b of the center post 32 can be more reduced.

The flange portion 32c of the center post 32 is tightly sandwiched between the claw portion 30g of the solenoid case 30 and the annular planar portion 30h of the solenoid case 30 by swaging the claw portion 30g to the flange portion 32c. In this manner, one end of the center post 32 and the solenoid case 30 are fixed to each other, and a gap (not shown) is formed in the axial direction between the other end (to be precise, the left end face of the holder 36 in the axial direction) of the center post 32 in the axial direction and the bottom plate 30m of the protrusion portion 30b of the solenoid case 30. Thus, when the claw portion 30g of the solenoid case 30 is swaged to the flange portion 32c of the center post 32, load application to the center post 32 can be prevented. Consequently, a structure less influencing the thin portion 32b of the center post 32 can be made, and the thickness of the thin portion 32b can be more reduced.

Moreover, the molded solenoid body 31 and the center post 32 are integrally formed, and the gap (not shown) is formed in the axial direction between the left end of the molded solenoid body 31 in the axial direction and the annular planar portion 30f of the solenoid case 30. Thus, load application to the molded solenoid body 31 can be prevented, and damage of the molded solenoid body 31 can be prevented. Further, when the claw portion 30g of the solenoid case 30 is swaged to the flange portion 32c of the center post 32, the load acting in the axial direction is applied to deform the molded solenoid body 31 formed integrally with the center post 32. Thus, load application to the center post 32 can be prevented, and the structure much less influencing the thin portion of the center post 32 can be made.

Further, a left end of the cylindrical portion 32a of the center post 32 in the axial direction is apart from the solenoid case 30 (to be precise, the protrusion portion 30b) through a gap (not shown) in the axial direction, and therefore, on the inner diameter side of the annular step portion 30c of the solenoid case 30, the load in the axial direction from the bottom plate 30m of the protrusion portion 30b of the solenoid case 30 less influences the cylindrical portion 32a (including the thin portion 32b) of the center post 32. Note that the resin holder 36 attached to the left opening portion end of the cylindrical portion 32a of the center post 32 in the axial direction functions as a buffer between the protrusion portion 30b of the solenoid case 30 and the cylindrical portion 32a of the center post 32 in a case where the protrusion portion 30b of the solenoid case 30 is deformed so as to be brought into contact with the holder 36.

Thus, the solenoid valve 1 of the present embodiment is configured such that the load in the axial direction and the radial direction is less applied to the cylindrical portion 32a (including the thin portion 32b) of the center post 32, and therefore, the thickness of the thin portion 32b of the center post 32 can be a thickness of equal to or less than 0.4 mm. As described above, the plate thickness of the thin portion 32b of the center post 32 is extremely small. Thus, when a magnetic circuit is formed by power distribution to the coil 34 in the ON state of the solenoid valve 1, magnetic resistance at the thin portion 32b of the center post 32 can be more increased, and a magnetic flux flow path at the periphery of the thin portion 32b can be deviated toward a plunger side to enhance magnetic force acting on the plunger 4.

The embodiment of the present invention has been described above with reference to the drawings, but a specific configuration is not limited to such an embodiment. Even change and addition made without departing from the scope of the present invention are included in the present invention.

In the above-described embodiment, when the solenoid valve is assembled, the flange portion 32c of the center post 32 is fixed to the solenoid case 30 by swaging the claw portion 30g of the solenoid case 30 and then the attachment portion 21d of the sleeve 21 is inserted into the recess portion 32e of the flange portion 32c of the center post 32 and fixed to the center post 32 by swaging process in a state in which the solenoid unit 3 is formed has been described. However, the order of assembling the solenoid valve 1 can be freely set. For example, after the attachment portion 21d of the sleeve 21 has been inserted into the recess portion 32e of the flange portion 32c of the center post 32 and the swaging process has been done, the flange portion 32c of the center post 32 may be fixed to the solenoid case 30 by swaging the claw portion 30g of the solenoid case 30 to form the solenoid unit 3. Note that in this case, in a state in which the attachment portion 21d of the sleeve 21 is inserted into the recess portion 32e of the flange portion 32c of the center post 32, the following swaging step may be performed in such a manner that the swaging tool 7 is driven in the radial direction into the flange portion 32c of the center post 32.

Alternatively, when the flange portion 32c of the center post 32 is fixed to the solenoid case 30 by swaging the claw portion 30g of the solenoid case 30, by the same swaging action the flange portion 32c of the center post 32 may be swaged to the attachment portion 21d of the sleeve 21 inserted into the recess portion 32e of the flange portion 32c of the center post 32 to deform radially inward.

Alternatively, the dimensions of the groove 21e of the sleeve 21 in the axial direction and the radial direction may be adjusted in accordance with the shape of the swaging tool 7 used for swaging, and in this manner, the swaging tool 7 can be easily driven in a state in which the swaging tool 7 is close to the sleeve 21. That is, the swaging process is easily performed.

Moreover, e.g., the dimensions and arrangement of various ports and grooves provided on the right side in the axial direction with respect to the large-diameter portion 21f at the sleeve 21 are not limited to those illustrated in FIGS. 1 to 3, and may be freely set according to use environment of the solenoid valve. At the sleeve 21, the through hole positioned adjacent to the drain port 24 over the large-diameter portion 21f may be not necessarily a feedback port.

REFERENCE SIGNS LIST

1 Solenoid valve
2 Valve unit
3 Solenoid unit
4 Plunger (movable iron core)
5 Rod
6 Swaging table (swaging jig)
6a Upper face
7 Swaging tool
21 Sleeve
21a Cylindrical portion
21b Through hole
21c opening end face
21d Attachment portion
21e Groove
21f Large-diameter portion
21g Peripheral face
21h Tapered face
22 Spool
23 Retainer
24 Drain port (through hole)
25 Feedback port (adjacent through hole)
30 Solenoid case
30a Cylindrical portion
30b Protrusion portion
30c Annular step portion (load receiving portion)
30d First cylindrical accommodation portion
30e Second cylindrical accommodation portion
30f Annular planar portion
30g Claw portion
30h Annular planar portion
30j opening portion
30k Side plate
30m Bottom plate
30n End plate (load receiving portion)
31 Molded solenoid body
32 Center post (stationary iron core)
32a Cylindrical portion
32b Thin portion
32c Flange portion
32d Through hole
32e Recess portion
34 Coil
35 Resin
36 Holder
60 Recess portion
S Space

The invention claimed is:

1. A solenoid valve comprising:
a sleeve configured such that a spool is movably arranged in an axial direction in the sleeve;
a stationary iron core;
a movable iron core; and
a solenoid unit fixed to one end of the sleeve in the axial direction and configured to move the spool in the axial direction in accordance with movement of the movable iron core,
wherein
the sleeve has a groove provided at an outer periphery thereof on a side of the solenoid unit and a through hole communicating with the groove and an inside of the sleeve,
an attachment portion adjacent to the groove in the axial direction is provided at the one end of the sleeve in the axial direction,
a recess portion having a larger axial dimension than that of the attachment portion is provided at the stationary iron core,
the stationary iron core is provided with a flange portion that is formed on one end thereof on a side of the sleeve and that extends toward an outer diameter side, and
the sleeve is fixed to the stationary iron core in such a manner that part of the flange portion is swaged to be deformed in an inner diameter direction by driving a swaging tool in the axial direction into the flange portion from the side of the sleeve in a state in which the attachment portion is internally fitted into the recess portion of the stationary iron core.

2. The solenoid valve according to claim 1, wherein
the groove has a larger axial dimension than that of the through hole.

3. The solenoid valve according to claim 2, wherein
the groove has, at least at one end thereof on a side of the attachment portion, a tapered shape in a cross section parallel to the axial direction.

4. The solenoid valve according to claim 2, wherein
the solenoid unit includes
a molded solenoid body arranged at an outer periphery of the movable iron core, a solenoid case configured to accommodate the movable iron core and the molded solenoid body, and
the stationary iron core arranged inside the molded solenoid body, the stationary iron core has a thin portion formed with a small plate thickness in a circumferential direction,
the solenoid case has a load receiving portion configured to receive a load in the axial direction when the swaging tool is driven in the axial direction into the flange portion of the stationary iron core, and
the load receiving portion is arranged on an opposite side to the flange portion in the axial direction as well as on the outer diameter side with respect to the thin portion.

5. The solenoid valve according to claim 2, wherein
the sleeve is provided with a large-diameter portion adjoining one end of the groove on an opposite side of the attachment portion, an outer diameter of the large-diameter portion being a maximum outer diameter of the sleeve.

6. The solenoid valve according to claim 5, wherein
the sleeve further has, in addition to the first through hole, a second through hole, wherein the first and second through holes are arranged to be opposite to each other through the large-diameter portion and to be out of phase in circumferential position.

7. The solenoid valve according to claim 1, wherein
the groove has, at least at one end thereof on a side of the attachment portion, a tapered shape in a cross section parallel to the axial direction.

8. The solenoid valve according to claim 7, wherein
the solenoid unit includes
a molded solenoid body arranged at an outer periphery of the movable iron core, a solenoid case configured to accommodate the movable iron core and the molded solenoid body, and
the stationary iron core arranged inside the molded solenoid body, the stationary iron core has a thin portion formed with a small plate thickness in a circumferential direction,
the solenoid case has a load receiving portion configured to receive a load in the axial direction when the swaging tool is driven in the axial direction into the flange portion of the stationary iron core, and
the load receiving portion is arranged on an opposite side to the flange portion in the axial direction as well as on the outer diameter side with respect to the thin portion.

9. The solenoid valve according to claim 7, wherein
the sleeve is provided with a large-diameter portion adjoining one end of the groove on an opposite side of the attachment portion, an outer diameter of the large-diameter portion being a maximum outer diameter of the sleeve.

10. The solenoid valve according to claim 9, wherein
the sleeve further has, in addition to the first through hole, a second through hole, wherein the first and the second through holes are arranged to be opposite to each other through the large-diameter portion and to be out of phase in circumferential position.

11. The solenoid valve according to claim 1, wherein
the solenoid unit includes
a molded solenoid body arranged at an outer periphery of the movable iron core, a solenoid case configured to accommodate the movable iron core and the molded solenoid body, and
the stationary iron core arranged inside the molded solenoid body, the stationary iron core has a thin portion formed with a small plate thickness in a circumferential direction,
the solenoid case has a load receiving portion configured to receive a load in the axial direction when the swaging tool is driven in the axial direction into the flange portion of the stationary iron core, and
the load receiving portion is arranged on an opposite side to the flange portion in the axial direction as well as on the outer diameter side with respect to the thin portion.

12. The solenoid valve according to claim 11, wherein
the sleeve is provided with a large-diameter portion adjoining one end of the groove on an opposite side of the attachment portion, an outer diameter of the large-diameter portion being a maximum outer diameter of the sleeve.

13. The solenoid valve according to claim 12, wherein
the sleeve further has, in addition to the through hole, another through hole, the two through holes being arranged to be opposite to each other through the large-diameter portion and to be out of phase in circumferential position.

14. The solenoid valve according to claim 1, wherein
the sleeve is provided with a large-diameter portion adjoining one end of the groove on an opposite side of the attachment portion, an outer diameter of the large-diameter portion being a maximum outer diameter of the sleeve.

15. The solenoid valve according to claim 14, wherein
the sleeve further has, in addition to the first through hole, a second through hole, wherein the first and second through holes are arranged to be opposite to each other through the large-diameter portion and to be out of phase in circumferential position.

* * * * *